United States Patent [19]  [11] 4,036,332
Sander  [45] July 19, 1977

[54] SLACK ADJUSTER BUILT INTO A BRAKE UNIT FOR A RAIL VEHICLE BRAKE SYSTEM

[75] Inventor: Nils Börje Lennart Sander, Malmö, Sweden

[73] Assignee: Svenska Aktiebolaget Bromsregulator, Malmo, Sweden

[21] Appl. No.: 699,387

[22] Filed: June 24, 1976

[30] Foreign Application Priority Data

July 14, 1975 Sweden .................................. 7508016

[51] Int. Cl.² .................... F16D 65/66; B61H 15/00
[52] U.S. Cl. .................................. 188/196 D; 188/203
[58] Field of Search ............... 188/196 P, 196 D, 198, 188/199, 71.8, 71.9, 153 R, 153 D, 202, 203, 79.5 R, 79.5 GC, 79.5 GE; 92/13.1, 13, 13.3, 13.7, 13.6

[56] References Cited

U.S. PATENT DOCUMENTS

| | | | |
|---|---|---|---|
| 2,246,873 | 6/1941 | Browall | 188/198 |
| 3,744,596 | 7/1973 | Sander | 188/196 D X |
| 3,878,924 | 4/1975 | Nadas | 188/203 |
| 3,891,067 | 6/1975 | Axelsson | 188/196 D |

Primary Examiner—Trygve M. Blix
Assistant Examiner—Douglas C. Butler
Attorney, Agent, or Firm—Laurence R. Brown

[57] ABSTRACT

A brake adjuster mechanism is of the type operable by a piston moving a threaded spindle axially during braking with a threaded nut thereon adjusting the spindle position. Two control members movable with the spindle are held apart by a spring between shoulder stops on the nut and they serve to position the nut between two opposed clutch surfaces to permit nut rotation until a predetermined slack setting is achieved.

14 Claims, 3 Drawing Figures

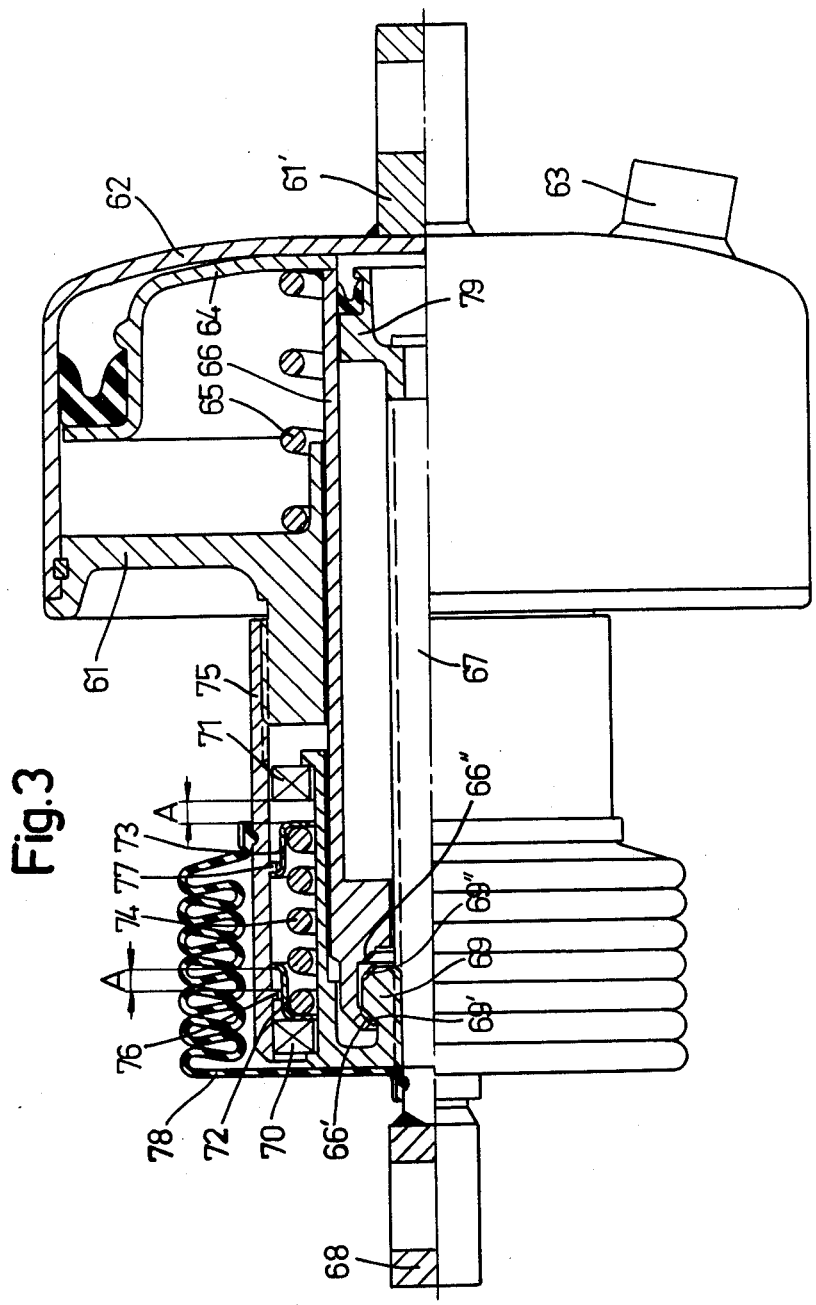

SLACK ADJUSTER BUILT INTO A BRAKE UNIT FOR A RAIL VEHICLE BRAKE SYSTEM

This invention relates to a slack adjuster built into a brake unit for a rail vehicle brake system and including a piston tube attached to the piston of the unit, a displaceable non-rotatable spindle coaxial with the piston tube, a nut in non-self-locking thread engagement with the spindle, two opposite clutch surfaces on the nut for co-operation with corresponding clutch surfaces on the piston tube, and a spring acting on the nut.

Many such slack adjusters with only one nut for performing its intended function are known. One typical example is shown in the German Patent Publication No. 23, 37, 420 (U.S. Pat. No. 3,878,924). The slack adjuster shown therein has certain drawbacks, of which the most important one perhaps is that some difficulties are involved in altering the desired control distance for the slack adjuster. In fact, certain parts in the adjuster need be replaced in order to effect such an alteration.

One of the objects of the present invention is to remove this and other drawbacks with known slack adjusters of the kind referred to above and to attain an improved slack adjuster, which works properly under all circumstances and for long periods without maintenance but which is still simple and not too expensive.

This is attained according to the invention in that the spring is arranged between a fore control means (as viewed in the brake application direction), which in a rest position is behind a fore housing shoulder at a distance corresponding to the desired slack and coacts with a fore nut shoulder, and a rear control means, which in the rest position is in front of a rear nut shoulder at a distance corresponding to the slack and coacts with a rear housing shoulder. The said distance is the control distance.

In order to simplify the altering of the control distance as much as possible the two housing shoulders are arranged on a control sleeve, whose axial position in the housing of the unit is adjustable, preferably in that the sleeve is threaded into the housing. In order to alter the control distance it is thus only necessary to adjust the position of the sleeve relative to the housing.

The rear nut shoulder is designed as a thrust bearing, whereas the fore nut shoulder may be a thrust bearing or may be fixed depending on whether the slack adjuster is intended to be double-acting or single-acting.

In slack adjusters of the kind referred to above the spindle has to be under the action of a force in the brake application direction. In a preferred embodiment of the present invention this force is created in that the fluid pressure acting on the piston of the unit is also made to act on a spindle piston arranged on the spindle and in the piston tube.

A spring-biassed check valve may be arranged between a working fluid chamber at the piston and a chamber in the piston tube at the spindle piston; the valve has its closing direction from the latter to the former. In this way the maximum pressure from a foregoing brake application will prevail at the spindle piston and act on the same.

BRIEF DESCRIPTION OF THE DRAWINGS

The invention will be described in further detail below reference being made to the accompanying drawings, in which FIGS. 1–3 are partly sectional views of three embodiments of a brake unit with a built-in slack adjuster according to the invention.

Figure 1:
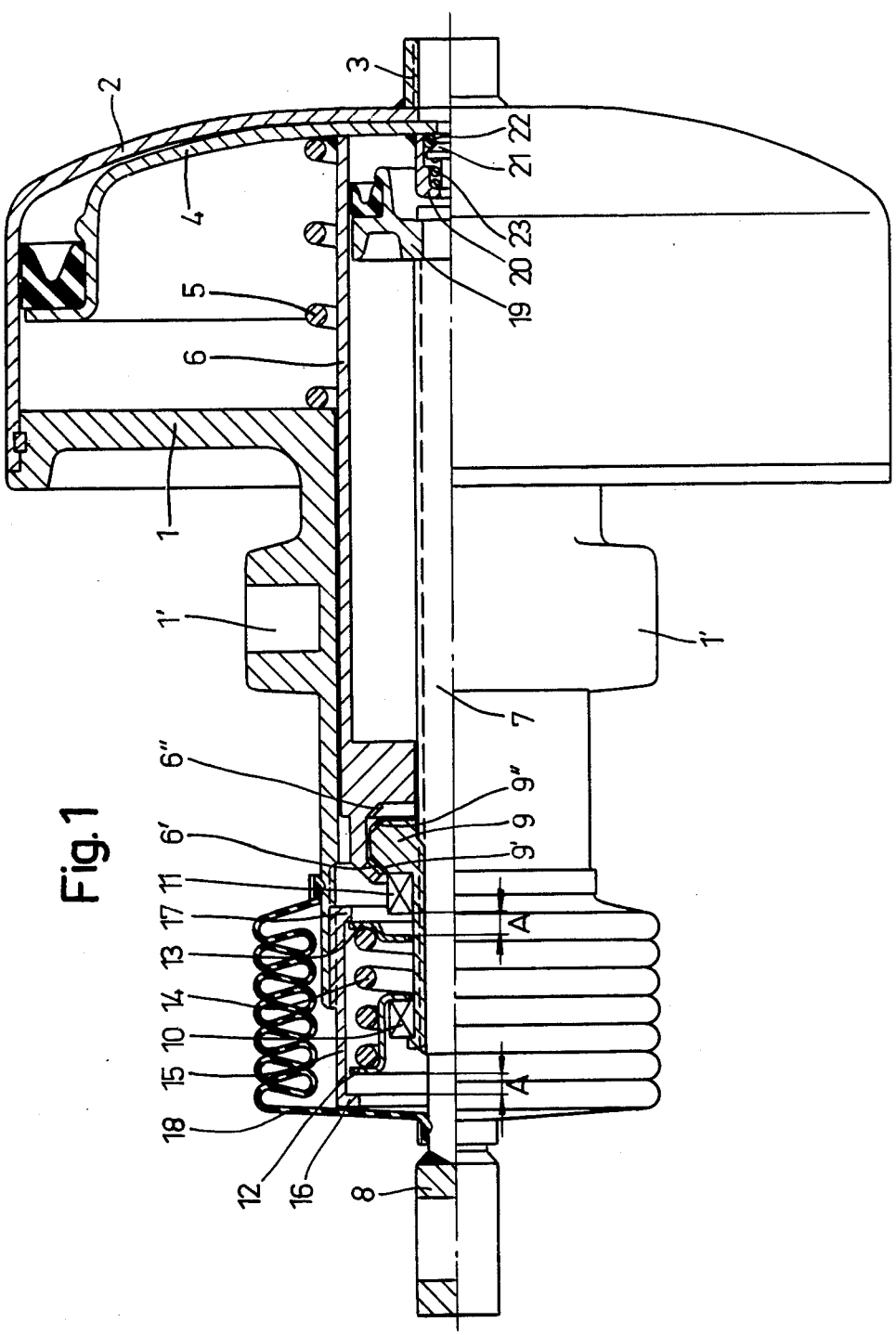

Referring first to FIG. 1 a brake unit housing 1 is to be attached to a suitable part of a rail vehicle underframe by means of attachments 1'. A cylinder 2 is fixed to the housing 1 and is provided with a fluid pressure inlet 3. A piston 4 provided with an ordinary sealing is axially movable in the cylinder 2 under the action of on the one hand fluid pressure admitted through the inlet 3, on the other hand a return spring 5. A piston tube 6 is welded to the piston 4 and is guided for axial movements by the housing 1.

A threaded spindle 7 is coaxial with the piston tube 6 and displaceable therein. It is welded to an ear 8 which is to be connected to further parts of the rail vehicle brake system. In this way the spindle will be non-rotatable.

A nut 9 is in non-self-locking thread engagement with the spindle 7 and is as shown provided with two opposite, preferably toothed clutch surfaces 9' and 9" for cooperation with corresponding and likewise preferably toothed clutch surfaces 6' and 6" on the piston tube 6. The distance between the spindle surfaces is greater than the distance between the nut surface, and thus two clutches 6', 9'; 6", 9" are formed. In the shown position the left clutches 6', 9', which can be defined as the fore clutch, is engaged, whereas the right or rear clutch 6", 9" is disengaged. As shown in nut 9 is extended to the fore and is there provided with a fore thrust bearing 10 and a rear thrust bearing 11 for coaction with a fore control means 12 and a rear control means 13 respectively, both annular and of stamped sheet metal. A control spring 14 is arranged between the two control means 12 and 13 and urges these apart.

A control sleeve 15 provided with a fore shoulder 16 and a rear shoulder 17 is threaded into the housing 1. In the shown rest position the fore control means 12 is at a distance A (called the control distance) from the fore control sleeve shoulder or housing shoulder 16, whereas the same distance A may be found between the rear control means 13 and the rear thrust bearing 11, which may be called a rear nut shoulder. In the same way the fore thrust bearing 10 may be called a fore nut shoulder.

Due to the fact that the control sleeve 15 is threaded into the housing 1 and also due to the arrangement of the different parts relative to each other the control distance A can be altered by altering the position of the control sleeve 15 relative to the housing 1, and it is to be noted that this alteration occurs both at the fore and at the rear control means 12 and 13 respectively. This means that it is very simple to change the control distance and that no parts have to be replaced.

A rubber bellows 18 is arranged between the housing 1 and the spindle 7 over the described mechanism to prevent dust, water etc. from entering.

A spindle piston 19 is attached to the spindle 7 and is sealed in an ordinary way relative to the piston tube 6. A check valve is arranged in a central opening in the piston 4 and comprises a valve sleeve 20 attached to the piston 4, a valve body 21, a sealing ring 22 between the valve body 21 and the piston 4, and a valve spring 23 between the valve body 21 and the valve sleeve 20. In this way fluid pressure admitted through the inlet 3 will not only act on the piston 4 but also on the spindle piston 19, so that a force in the brake application direction will act on the spindle 7 during a brake application.

Due to the check valve 20-23 the maximum fluid pressure will remain even after the fluid pressure acting on the piston 4 has decreased and the device has returned to the shown position under the action of the return spring 5.

When mounted to a rail vehicle underframe by means of the attachments 1', linked to further parts of the brake rigging by means of the ear 8, and connected to a source of fluid pressure the brake unit according to FIG. 1 will work in the manner hereinafter described. Three different conditions are possible: the slack is the desired (or in other words corresponds to the control distance A), the slack is too small, or the slack is too large.

In the shown rest position the piston 4 bears against the cylinder 2 under the action of the return spring 5, which is more powerful than the control spring 14. This means that during the return movement of the cylinder 2 this latter spring 14 bearing against the rear housing shoulder 17 via the rear control means 13 has been compressed to the shown position where the spring force holds the fore clutch 6', 9' engaged via the fore control means 12, the fore thrust bearing 10, and the nut 9.

At the admission of fluid pressure through the inlet 3 the piston 4 with the piston tube 6 will be displaced to the left or in the brake application direction. Also the spindle piston 19 will be acted upon by the fluid pressure, so that the spindle 19 will be acted upon by the fluid pressure, so that the spindle 7 will be urged in the brake application direction. During the application stroke the nut 9 will be held against rotation by the remaining engagement of the fore clutch 6', 9'.

If the application stroke is the desired length, the brake block or pad will reach the wheel or disk at the same time as the fore control means 12 reaches the fore housing shoulder 16 and the rear thrust bearing 11 reaches the rear control means 13.

If on the other hand the application stroke is too short, for example due to a foregoing replacement of a worn out brake block or pad, the brake block or pad will reach the wheel or disk while there still remains a distance between on the one hand the fore control means 12 and the fore housing shoulder 16, and on the other hand between the rear control means 13 and the rear thrust bearing 11. The spindle 7 is prevented from following the continuing displacement of the piston 4 with the piston tube 6 which means that the fore clutch 6', 9' will be disengaged allowing the nut 9 to rotate on the spindle 7 under the influence of the control spring 14 acting via the fore thrust bearing 10, which permits relative rotation between the nut 9 and the fore control means 12. This rotation will continue until the fore control means 12 has reached and fore housing shoulder 16 and the rear thrust bearing 11 has reached the rear control means 13. In this way a proper application stroke has been re-established, as the nut 9 has been displaced on the spindle 7 a distance corresponding to the shortness of the application stroke.

At the further operation in the elasticity part of the application stroke the piston 4 with the piston tube 6 will continue to the left, whereas the spindle 7 and the nut 9 will be unable to follow this displacement due to the engagement between the brake block or pad with the wheel or disk. This means that the fore clutch 6', 9' will disengage and the rear clutch 6", 9" immediately engage and that the force from the piston tube will be transmitted via the latter clutch to the nut 9 and the spindle 7. These members will move together in the elasticity part of the application stroke; during this further displacement the rear thrust bearing 11 will lift the rear control means 13 from the rear housing shoulder 17 against the action of the control spring 14, whereas the fore thrust bearing 10 will leave the fore control means 12, which is unable to move further forward due to its engagement with the fore housing shoulder 16.

At decreasing fluid pressure the return or release stroke will commence. The diminishing force in the brake rigging means that the elastic deformation therein will disappear and that the spindle 7 will push the piston tube 6 and the piston 4 backwards via the nut 9 and the rear clutch 6", 9". At the same moment as the brake block or pad leaves the wheel or disk (or in other words lies without force on the same) the rear clutch 6", 9" will disengage and the fore clutch 6', 9' engage under the action of the force acting to the left on the spindle 7 from the fluid under pressure at the spindle piston 19, which fluid is prevented from escaping by the check valve 20-23. When the fore clutch 6', 9' engages, the fore control means 12 bears against both the fore housing shoulder 16 and the fore thrust bearing 10 and the rear control means 13 against both the rear housing shoulder 17 and the rear thrust bearing 11.

During the continuing return movement under the action of the return spring 5 the following parts will move together: the piston 4 with its piston tube 6, the nut 9, the spindle 7, and the fore control means 12, until the position according to FIG. 1 has again been reached.

It is now clear that a too small application stroke or in other words a too small slack is adjusted at the application stroke. As appears from the description below, also a too large slack or application stroke due to wear of the brake block or pad will normally be adjusted at the application stroke.

Before describing the conditions in the slack adjuster itself during a brake application with a too large slack the conditions at the spindle piston 19 and the check valve 20-23 are discussed. At a preceding full brake application (irrespective of the magnitude of the slack) fluid under full brake pressure has been trapped by the check valve 20-23 at the spindle piston 19 and urges the same to the left. Depending on the sealings this pressure will prevail for a longer or shorter time. In the description immediately below it is assumed that this pressure gives a force to the left on the spindle overcoming the friction forces in the brake rigging during the brake application.

Now, if the slack exceeds the distance A, a condition will occur at the application stroke with the force control means 12 contacting the fore housing shoulder 16 and the rear control means 13 contacting the rear thrust bearing 11 (with the fore clutch 6', 9' engaged) but with the brake block or pad still at a distance from the wheel or disk corresponding to the excessive slack. At the continued application stroke the fore thrust bearing 10 will leave the fore control means 12, whereas the rear control means 13 will be lifted from the rear housing shoulder 17, so that the force from the spring 14 is transmitted to the nut 9 via the rear control means 13 and the rear thrust bearing and so that the fore clutch 6', 9' is disengaged allowing the nut to rotate on the spindle 7, until the brake block or pad engages the wheel or disk. A force in the spindle 7 to the right in the FIG. 1 is now built up overcoming the force to the left on the spindle 7, which means that the rear clutch 6", 9" will be engaged and thus that the brake force will be transmitted from the piston tube 6 to the spindle 7 and further parts of the brake rigging via the said clutch and the nut 9 now held against rotation on the spindle.

At decreasing fluid pressure a return movement will occur as described above.

The description above about the function at an excessive slack is built on the assumption that there is a certain pressure at the spindle piston 19 or in other words that there is a certain force to the left on the spindle 7. However, such a pressure may be lacking in certain cases: If a long time has lapsed since the preceding brake application the pressure at the spindle piston 19 may have dropped due to the inevitable leaking at the sealings. Further the check valve 20–23 may be faulty or lacking altogether (see the description below referring to FIG. 3). Assuming now that the pressure at the spindle piston 19 corresponds to the pressure at the piston 4 two conditions are possible: If the friction forces in the brake rigging are low, the pressure on the spindle piston 19 may be enough to overcome the force from the brake rigging during the application stroke; in such a case the function will be as described and any excessive slack will be taken up at the application stroke. On the other hand, if the friction forces from the brake rigging are enough to overcome the force in the spindle 7 to the left in the Figure from the fluid pressure acting on the spindle piston 19, the function at an excessive slack will be as follows.

At the application stroke the parts will move together to the left a distance corresponding to the control distance A. Thereupon the force clutch 6', 9' will be disengaged and the rear clutch 6", 9" engaged, so that at the further movement corresponding to the excessive slack the nut 9 will be held against rotation; the fore thrust bearing 10 will be lifted from the fore control means 12, whereas the rear control means 13 will be lifted from the rear housing shoulder 17.

When the brake block or brake pad is about to leave the wheel or disk at the return stroke the above described position will prevail with the rear clutch 6", 9" engaged, the fore control means 12 applied against the fore housing shoulder 16, and the rear thrust bearing 11 lifting the rear control means 13 from the rear housing shoulder 17 against the action of the control spring 14. At the continuing return movement of the piston 4 with the piston tube 6 under the action of the return spring 5 the rear clutch 6", 9" will be disengaged and the nut 9 will be able to rotate on the spindle 7 under the action of the control spring 14 via the rear control means 13 and the rear thrust bearing 11.

When the excessive slack has been eliminated during the return stroke, the rear control means 13 will engage the rear housing shoulder 17 at the same time as the force control means 12 is about to leave the fore housing shoulder. This means that at a continued return movement the force from the control spring 14 will act in the opposite direction on the nut 9 via the fore control means 12 and the fore thrust bearing 10, whereas the rear thrust bearing will leave the rear control means 13, so that the fore clutch 6', 9' will be engaged preventing the nut from any further rotation. At the end of the return stroke the shown position will be attained.

Figure 2:
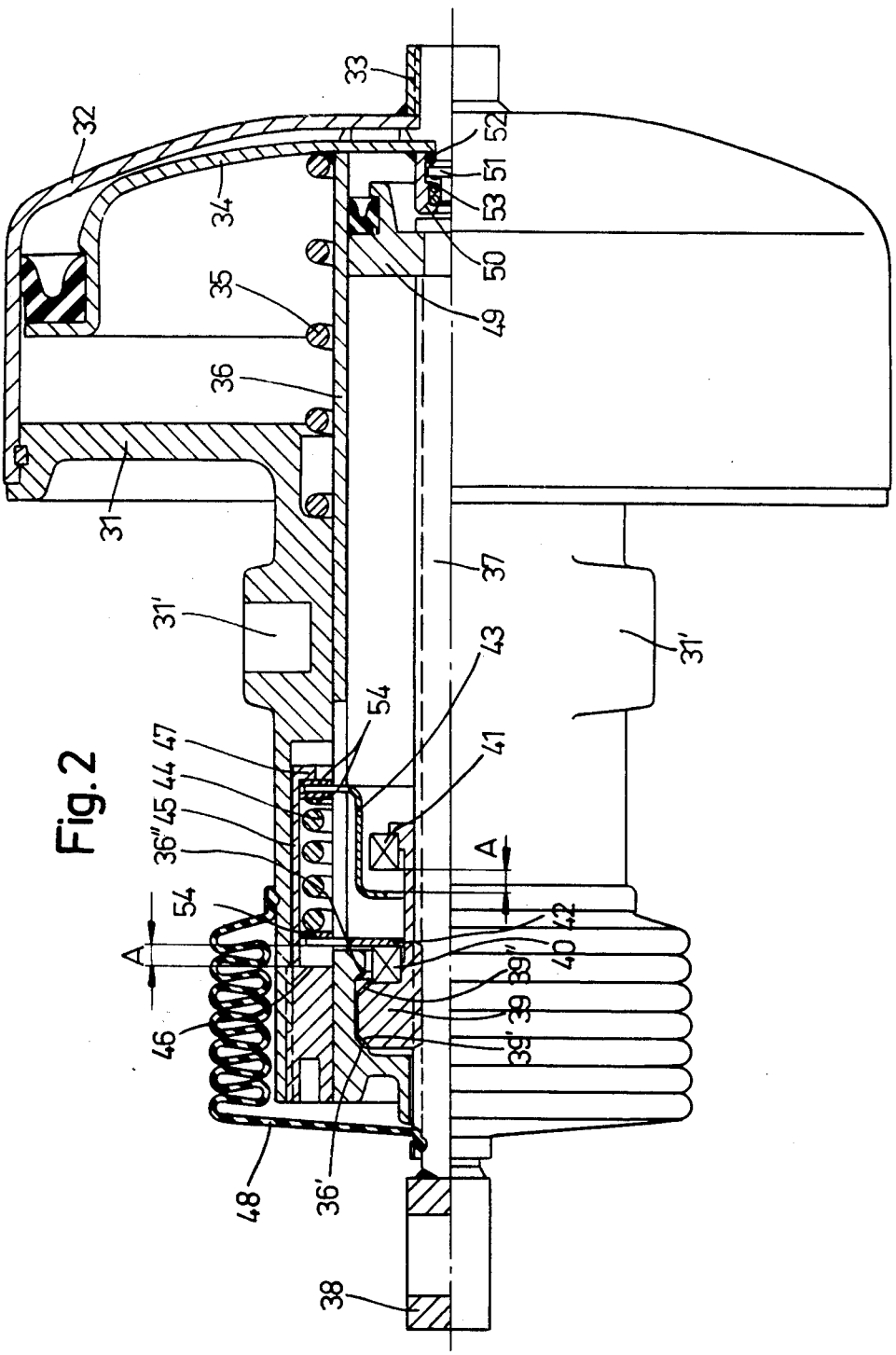

A second embodiment of the invention is shown in FIG. 2. It consists of substantially the same elements, coacting in substantially the same way but in some cases differently placed relative each other. The elements in this unit are: A housing 31 with attachments 31', a cylinder 32 with an inlet 33, a piston 34 with a piston tube 36, a return spring 35, a spindle 37 with an ear 38, a nut 39 in non-self-locking engagement with the spindle 37 and with a fore clutch surface 39' and a rear clutch surface 39", for cooperation with a fore clutch surface 36' and a rear clutch surface 36" respectively on the piston tube 36, a fore nut shoulder 40 in the form of a thrust bearing, a rear nut shoulder 41 also in the form of a thrust bearing, a fore control means 42 and a rear control means 43, a control spring 44, a control sleeve 45, a fore housing shoulder 46, a rear housing shoulder 47, a rubber bellows 48, a spindle piston 49, a valve sleeve 50, a valve spindle 51, a sealing ring 52, and a valve spring 53. Also in this case a control distance A is formed in the shown rest position between on the one hand the fore control means 42 and the fore housing shoulder 46, and on the other hand between the rear control means 43 and the rear thrust bearing 41.

In this embodiment the nut extension is arranged "behind" the nut itself, which means that the piston tube 36 has to be provided with axial slots for the correspondingly fingered control means 42 and 43. As these fingers do not provide a proper support for the control spring 44 and relative to the rear housing shoulder 47, supporting rings 54 are arranged at these places.

The function of this embodiment is exactly the same as that of the embodiment according to FIG. 1. The function description above may be used; only add 30 to all numerals.

Also a third embodiment according to FIG. 3 consists of substantially the same elements as the two former embodiments, the only difference being the omission of the check valve at the piston.

The list given above for the elements in the FIG. 2 embodiment may be used also for this embodiment; only add 30 to all numerals (or 60 to the numerals used in FIG. 1).

It appears that this embodiment is most similar to the one according to FIG. 1, as also here the nut extension functionally is placed "in front of" the nut 69 itself. However, in order to save axial space or in other words to attain a very short unit with great slack adjusting capacity, the nut consists of two connected coaxial parts, of which the inner one is the nut itself and the outer one is the extension with the thrust bearings 71 and 72.

Further, in this case there is no check valve at the spindle piston 79, which means that the latter will always be actuated by the same pressure as the piston 64. Functionally this means that an excessive slack will be reduced at the application provided that the friction in the brake rigging is comparatively small but at the return stroke under other circumstances. (These conditions have been described above.) It may here be noted that all three embodiments may have this check-valve-free design and that in the same way the FIG. 3 embodiment may be equipped with such a valve.

If at an embodiment with a check valve it is desirable to bring back the spindle manually at a replacement of a worn-out brake block or pad it may be advantageous to complete the design somewhat. At an attempt to bring back the spindle 7 or 37 manually a rising pressure will be built up at the spindle piston 19 or 49 if no measures are taken. To obviate this a stationary mechanical means (not shown) attached to the cylinder 2 or 32 in the vicinity of the valve body 21 or 51 will move the valve body to the left in the figures and thus will open the check valve when the piston 4 or 34 is fully retracted under the action of the return spring 5 or 35 and when a force from the compressed air at the spindle piston is applied to the right on the piston at an attempt to bring back the spindle 7 or 37 manually.

Many modifications of the slack adjuster as represented by the three shown and described embodiments are possible within the scope of the appended claims.

The most important modification is that it is possible to transform the double-acting slack adjuster to a single-acting one. This is attained in that the fore nut shoulder 10; 40; 70, which is a thrust bearing in the double-acting version, is transformed into a stationary or non-rotating part. The thrust bearing 10; 40; 70 is thus replaced by a stationary ring with the effect that a too small slack cannot be adjusted as the nut 9; 39; 69 is unable to rotate at the brake application stroke when the fore clutch 6', 9'; 39'; 66',69' is disengaged due to the engagement of the brake block or pad with the wheel or disk and the force of the control spring 14; 44; 74 acts on the nut 9; 39; 69 via the fore control means 12; 42; 72 and the fore nut shoulder 10; 40; 70.

Another modification within the scope of the appended claims is the replacement of the present means for giving a force on the spindle 7; 37; 67 in the brake application direction, i.e. the spindle piston 19; 49; 79 and the fluid pressure acting thereon. Another solution could be to have an internal spring arrangement acting on the spindle in the brake application direction. Also an external force on the spindle may be used, for example in the form of a spring.

A further possible modification is to arrange the outwardly directed clutch surfaces on the piston tube and the corresponding inwardly directed clutch surfaces on the nut at a greater axial distance from each other than the former.

Other modifications are also possible.

We claim:

1. A slack adjusting brake unit mechanism for railway brake systems comprising in combination, a piston, a tube member attached to said piston and axially movable with said piston, an axially movable non-rotatable threaded spindle adapted for connection to the braking system coaxially positioned within said tube, a nut in non-self-locking thread engagement with said spindle having two opposed clutch surfaces axially displaced by the nut a first predetermined distance, a set of two clutch surfaces on said tube disposed for respectively mating with said clutch surfaces on said nut in different axial positions of said nut and spaced at an axial distance greater than said first predetermined distance thereby to transmit force from said piston to said spindle, two spaced shoulders on said nut, a fore control member and a rear control member both axially movable spaced between said two shoulders and adapted to engage them to limit axial movement of each respective control member in a corresponding direction, a spring between said control members urging them apart toward engagement with said shoulders, a housing, limit means affixed to said housing at two spaced positions limiting movement of said control members axially over a predetermined slack adjustment distance between said shoulders whereby contact of either said control member with a respective one of said limit means to move such away from one of said shoulders causes axial motion of said spindle to move said nut from a position with one opposed clutch surface thereon non-rotatably engaged with a corresponding mating clutch surface on said tube to an opposed axial position with the opposite clutch surfaces non-rotatably engaged passing through an intermediate position wherein the nut will rotate on said spindle with axial motion of the spindle.

2. A slack adjuster mechanism as defined in claim 1, including means adjusting said predetermined slack adjustment distance.

3. A slack adjuster mechanism as defined in claim 2, wherein said means limiting movement of said control members is a rotatable tube threaded into said housing coaxial with said spindle to thereby permit displacement of the rotatable tube along the axial direction of said spindle.

4. A slack adjuster mechanism as defined in claim 1 wherein at least one said shoulder comprises a thrust bearing permitting relative rotation of said nut and said control member when the control member rests against said at least one shoulder.

5. A slack adjuster mechanism as defined in claim 1 wherein both said shoulders are on one axial side of said nut.

6. A slack adjuster mechanism as defined in claim 5 wherein said shoulders are both on the fore side of said nut.

7. A slack adjuster mechanism as defined in claim 5 wherein said shoulders are both on the rear side of said nut.

8. A slack adjuster mechanism as defined in claim 5 wherein said nut has two coaxially spaced parts commonly rotatable about said spindle, and wherein said shoulders are located on that part spaced from the threads on said spindle.

9. A slack adjuster mechanism as defined in claim 1 including a spindle piston adapted to move said spindle axially in response to fluid pressure, check valve means holding fluid pressure in said spindle piston, and means providing fluid pressure to said spindle piston and said first mentioned piston simultaneously.

10. A slack adjuster mechnism as defined in claim 1 including means to bias said spindle axially to move away from said piston.

11. A slack adjuster mechanism as defined in claim 1, wherein at rest position of said piston the fore control member is spaced a predetermined distance from the corresponding limit affixed to said housing, thereby defining a control distance setting a desired slack condition.

12. A slack adjuster mechanism as defined in claim 11, wherein the rear control member is held in a position spaced from the remaining limit affixed to the housing by said control distance by means of one said shoulder on said nut.

13. A slack adjuster mechanism as defined in claim 1 having structure non-rotatably engaging the fore control member with the fore shoulder on said nut.

14. A slack adjuster mechanism as defined in claim 1, wherein the spring between said control members influences said nut to rotate on said spindle.

* * * * *